March 8, 1960
C. N. RAUP
2,927,817
SLIDABLE AND DETACHABLE INTERLOCKING
CONNECTION OF A VEHICLE
BODY TO A CHASSIS
Filed Jan. 13, 1958
2 Sheets-Sheet 1
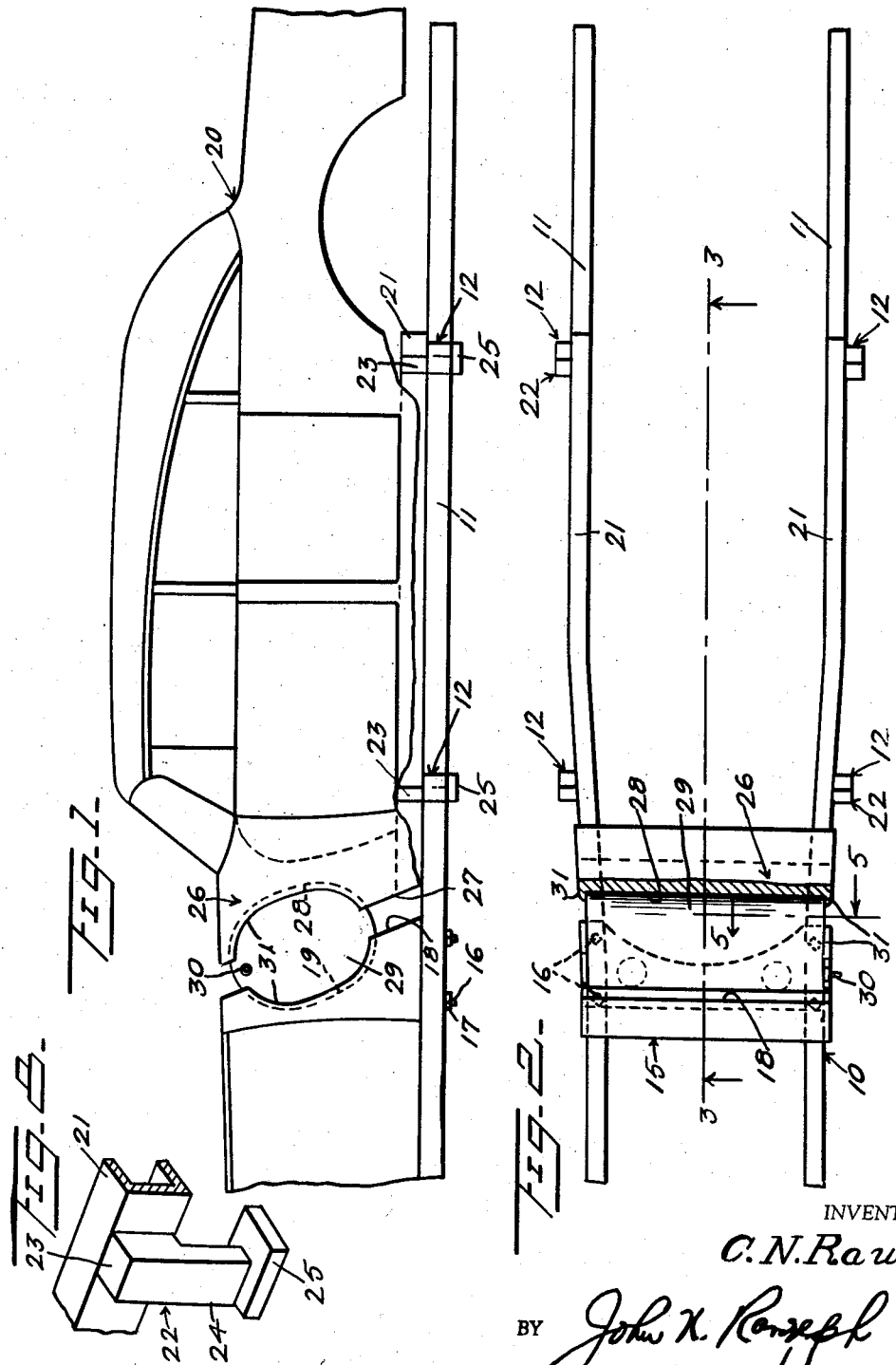
INVENTOR
C. N. Raup
BY John K. Rouzell
ATTORNEY

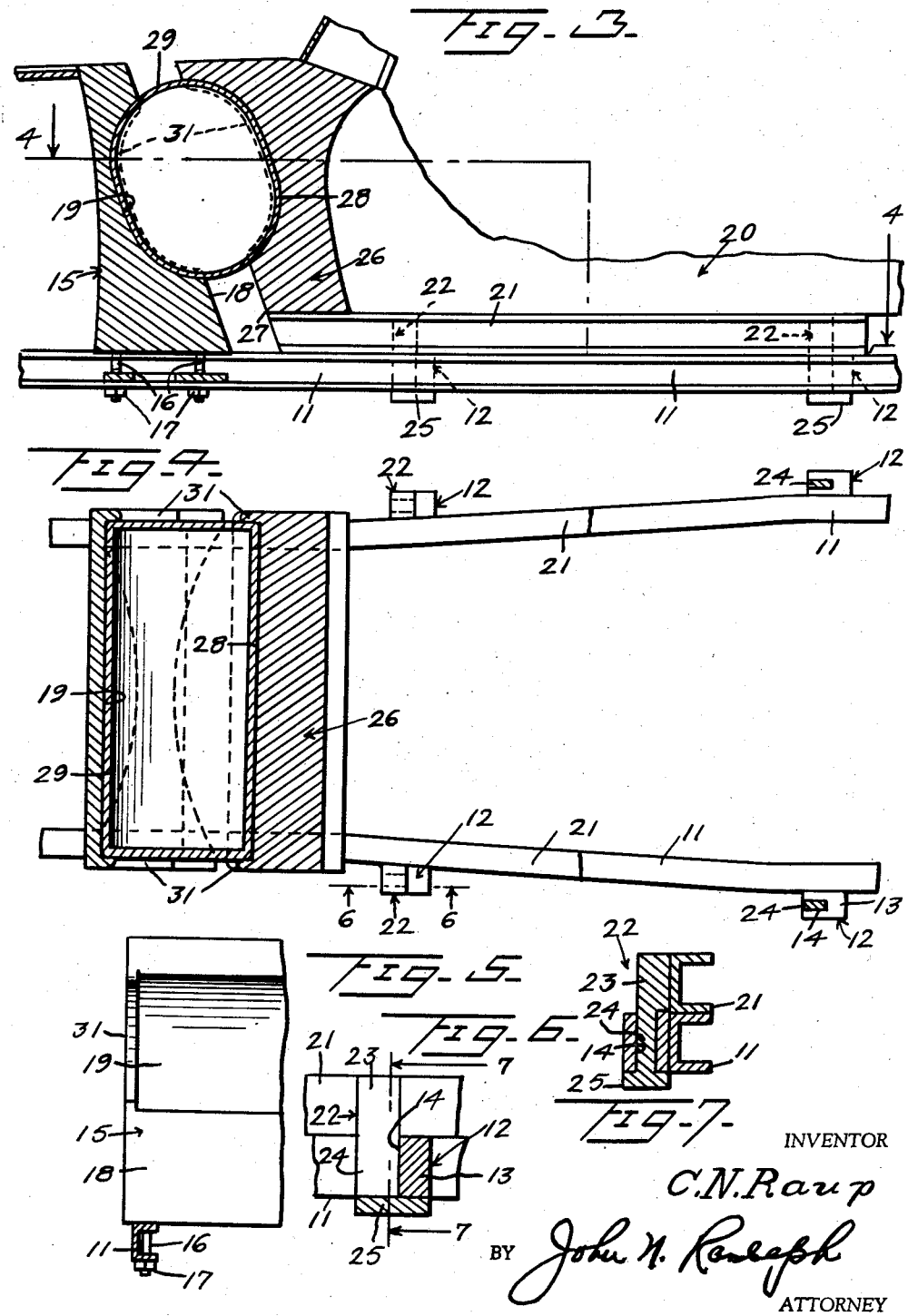

United States Patent Office 2,927,817
Patented Mar. 8, 1960

2,927,817

SLIDABLE AND DETACHABLE INTERLOCKING CONNECTION OF A VEHICLE BODY TO A CHASSIS

Clyde Nelson Raup, Catawissa, Pa.

Application January 13, 1958, Serial No. 708,579

5 Claims. (Cl. 296—35)

This invention relates to novel features of construction of an automobile chassis and body and to novel means for demountably securing the body on the chassis by a combination of mechanical means including a cushioning member containing compressed air.

Another object of the invention is to provide a chassis and body assembly having a compressed air cushion disposed beyond the forward end of the vehicle body to permit a limited yielding and displacement of the body forwardly of the chassis and to permit a complete disengagement of the body automatically from the chassis in the event of a head-on collision of the vehicle whereby under such circumstances injury to the passengers will be substantially minimized.

A further object of the invention is to provide a yieldable body and chassis connection permitting a slight displacement of the body forwardly of the chassis, without disconnection of the body from the chassis, in response to a sudden impact tending to stop forward movement of the vehicle but which is not of sufficient force to substantially demolish the forward end of the vehicle, whereby the passenger compartment in yielding relative to the chassis will minimize the inertia effect tending to throw the passengers forwardly of the body.

Another object of the invention is to provide a cushioned mounting of an automobile body which will minimize injury to passengers caused by safety belts, through the yielding forward movement of the body relative to the chassis.

Still another object of the invention is to provide assembly of the aforedescribed character of extremely simple construction and by means of which a vehicle body can be quickly assembled and secured on or detached from a vehicle chassis.

Other objects and advantages of the invention will hereinafter become more fully apparent from the following description of the drawings, illustrating a presently preferred embodiment thereof, and wherein:

Figure 1 is a fragmentary side elevational view of a portion of an automobile chassis and body assembled thereon, with certain of the parts broken away;

Figure 2 is a horizontal sectional view of a portion of the vehicle body and showing the chassis in top plan;

Figure 3 is an enlarged fragmentary longitudinal vertical sectional view, taken substantially along a plane as indicated by the line 3—3 of Figure 2;

Figure 4 is a horizontal sectional view taken substantially along the line 4—4 of Figure 3;

Figure 5 is a fragmentary transverse vertical sectional view, on an enlarged scale, taken substantially along a plane as indicated by the line 5—5 of Figure 2, and with the air cushion omitted;

Figure 6 is an enlarged detailed vertical sectional view taken substantially along a plane as indicated by the line 6—6 of Figure 4;

Figure 7 is a transverse vertical sectional view, taken substantially along a plane as indicated by the line 7—7 of Figure 6, and Figure 8 is an enlarged fragmentary perspective view of a part of the vehicle body.

Referring more specifically to the drawings, an automobile chassis, designated generally 10, includes spaced side rails 11 each of which is provided with a plurality of longitudinally spaced lugs 12. The lugs 12 are rigidly secured to and project from outer sides of the rails 11. As best seen in Figures 4, 6 and 7, each lug 12 includes a solid rear portion 13 and a forward portion which is provided with a slot 14. The slot 14 opens outwardly of the forward end, underside and upper side of the lug 12, as best seen in Figure 6.

A bulkhead or abutment member 15 is disposed crosswise of the chassis 10, forwardly with respect to the lugs 12 and is supported by and may be an integral part of the side rails 11 or, as illustrated, may be provided with threaded studs 16 which extend downwardly through apertures, not shown, of the rails 11, which are engaged by nuts 17, which bear against the undersides of the rails 11, for removably securing the bulkhead 15 to the chassis 10. The bulkhead is substantially solid and has an upwardly and forwardly inclined rear face 18 in which a semioval shaped recess 19 is formed.

A vehicle body 20 includes a pair of transversely spaced sill members 21 on which the vehicle body is supported. The sill members 21 correspond in shape to portions of the side rails 11 and are spaced the same distance apart as said side rail portions to rest flush thereon, as illustrated in Figures 1 to 4, 6 and 7. Each sill member 21 is provided with two rigid hook members 22 which are spaced apart a distance corresponding to the spacing of the lugs 12 of each rail 11. As best seen in Figure 8, each hook member 22 has a thickened upper shank portion 23 which is rigidly secured to the outer side of the sill member 21 and a restricted lower shank portion 24 which extends downwardly from the sill member 21 and is outwardly offset relative thereto. Each hook member 22 also includes a flat bottom portion 25 which is fixed to the lower end of the shank portion 24 and which is enlarged relative to said shank portion 24 and disposed in a plane normal to the axis of the shank.

The body 20 includes a forward bulkhead or abutment portion 26 which is rigidly secured to and extends upwardly from the forward ends of the sill members 21. The bulkhead 26 is likewise substantially solid and has a downwardly and rearwardly inclined front face 27 in which a recess 28 is formed which corresponds in shape to the recess 19.

The recesses 19 and 28 are disposed in opposed relation to one another when the sill members 21 are resting on the rails 11 and the bulkhead surfaces 18 and 27 are disposed in spaced apart substantially parallel relation to one another when the hooks 22 are in engagement with the lugs 12, as seen in Figures 1 and 3. A puncture proof inflatable container or bag 29 is inserted between the recessed portions 19 and 28 and is provided with a conventional valve 30 at one end thereof by means of which the container 29 can be inflated. The container 29 when inflated is of a cross sectional shape and size to conformably seat in the recesses 19 and 28 and is of a length to extend substantially from side to side of the bulkheads 15 and 26. Said bulkheads are provided with flanges 31 at their ends, as best seen in Figure 4, which overlie portions of the ends of the inflated sack or cushion member 29 for retaining said member in the recesses 19 and 28. The cushioning member 29 is preferably inflated to approximately thirty pounds pressure and which may be accomplished before the body 20 is displaced rearwardly to its position of Figures 1 and 3, so that rearward displacement of the body 20 will be effected by inflation of the air cushion 29 to cause the hooks 22 to interengage with the lugs 12. The base portions 25 of the hooks are of a length from front to rear less than the gap between the faces 18 and 27 so that said base portions will be out of engagement with the undersides of the lugs 12 when the body 20 is displaced forwardly to position its front face 27 in engagement with the rear bulkhead face 18. When the hooks 22 are engaged with the lugs 12 the shank portions 24 thereof engage in the lug slots 14 and the base portions 25 bear against the undersides of the lugs, as best seen in Figures 6 and 7, to prevent upward displacement of the body 20 relative to the chassis 10 so that the body can only move forwardly relative to the chassis and is normally held against forward displacement by the inflated cushion 29.

From the foregoing it will be readily apparent that if the automobile strikes an obstruction while moving forwardly, the inflated cushion 29 will be momentarily compressed to allow the body 20 to move forwardly relative to the chassis 10 and this yielding movement of the body will effect a substantial reduction in shock to the passengers. Should a head-on collision of sufficient force occur, the body 20 will move forwardly until its front surface 27 contacts the rear bulkhead surface 18 to thus disengage the hooks 22 from the lugs 12 and so that the body can be deflected upwardly and away from the chassis by the compressed air cushion 29 and the camming engagement of the surface 27 with the surface 18 to thus substantially minimize shock and injuries which will be caused to the passengers of the body 20.

It will be understood that portions of the chassis 10 and body 20 which have not been shown in detail and which constitute no part of the present invention will be of conventional construction. It will also be understood that the bulkheads 15 and 26 may be provided with necessary openings, not shown, for operating linkages between the operator's compartment of the body 20 and the engine compartment of the vehicle located forwardly of the chassis bulkhead 15.

It will also be apparent that the bulkheads 15 and 26, especially the forward bulkhead 15 will afford a sturdy protective barrier which will effectively prevent a vehicle engine, not shown, from being driven rearwardly into the vehicle body as a result of a head-on collision.

Various modifications and changes are contemplated and may be resorted to, without departing from the function or scope of the invention as hereinafter defined by the appended claims.

I claim as my invention:

1. An automobile chassis and body assembly comprising, a chassis having laterally spaced side rails, an automobile body having laterally spaced sill members resting on and supported by said side rails, a bulkhead fixed to said side rails and extending upwardly therefrom, said body having a forward portion defining a bulkhead disposed behind said first mentioned chassis bulkhead and spaced therefrom, lug members rigidly secured to sides of the side rails, hook members rigidly secured to sides of the sill members and having depending portions engaging the lug members for connecting the sill members to said side rails, said hook members being disengageable from the lug members by forward displacement of the body relative to the chassis, and an air cushion interposed between and bearing against said bulkheads for urging the body rearwardly relative to the chassis to retain said hook members in engagement with the lug members.

2. An automobile chassis and body assembly as in claim 1, said bulkheads having opposed recesses in which portions of the inflated air cushion seat for confining the inflated air cushion between the bulkheads.

3. An automobile chassis and body assembly as in claim 2, said bulkheads having upwardly and forwardly inclined opposed faces normally disposed in spaced apart relation to one another for deflecting the forward end of the body upwardly when the bulkhead thereof is forcibly displaced forwardly against the chassis bulkhead.

4. An automobile chassis and body assembly as in claim 3, said bulkheads being of substantial thickness above, below and around said air cushion to provide reinforcing members capable of withstanding substantial impact forces.

5. An automobile chassis and body assembly as in claim 1, said lug members having forwardly opening slots, said depending hook portions including shanks engaging in and extending downwardly through the said slots, and said hook members having bottom portions constituting enlargements of the lower ends of said shanks and engaging the undersides of the lugs.

References Cited in the file of this patent

UNITED STATES PATENTS

| | | |
|---|---|---|
| 729,538 | Buffum | June 2, 1903 |
| 875,766 | Allen | Jan. 7, 1908 |
| 1,141,248 | Kadlec | June 1, 1915 |
| 1,895,171 | Nelson et al. | Jan. 24, 1933 |
| 2,114,663 | Erickson | Apr. 19, 1938 |
| 2,256,857 | Apostolou | Sept. 23, 1941 |
| 2,721,616 | Rocha | Oct. 25, 1955 |
| 2,798,568 | Zeller | July 9, 1957 |
| 2,865,222 | Bachman | Dec. 23, 1958 |

FOREIGN PATENTS

| | | |
|---|---|---|
| 705,020 | France | Mar. 2, 1931 |
| 25,220 | Switzerland | Jan. 16, 1902 |